United States Patent Office 3,178,453
Patented Apr. 13, 1965

3,178,453
DIETHYL [2-(5-NITROFURFURYLIDENE)
HYDRAZINO] THIOPHOSPHATE
Harry R. Snyder, Jr., Norwich, N.Y., assignor to The Norwich Pharmacal Company, a corporation of New York
No Drawing. Filed Apr. 5, 1962, Ser. No. 185,237
1 Claim. (Cl. 260—347.2)

This invention relates to a new chemical compound, O,O-diethyl [2-(5-nitrofurfurylidene)hydrazino] thiophosphate, having the formula

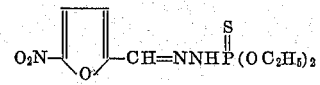

to its preparation and to compositions containing said compound.

This compound is particularly distinguished by its antiprotozoal properties. These properties make it a valuable agent for combatting diseases of veterinary importance, such as coccidiosis of chickens. When it is administered to chickens infected with *Eimeria tenella*, morbidity and mortality caused by that disease are checked. Administration of this compound for such purposes can be carried out very conveniently by simply admixing with the diet offered to the birds. Very small quantities incorporated in the diet, in the range of about 0.011% to 0.03% by weight, serve to produce the desired effect. For instance, when this compound is incorporated at a level of 0.022% by weight of the diet and such diet offered ad libitum to chickens lethally infected with *Eimeria tenella*, a protection of 75% of the birds against the ravages of that disease is obtained.

The preparation of the compound of this invention is readily effected by bringing together 5-nitro-2-furaldehyde and O,O-diethyl hydrozidothionphosphate. The end product is secured in high yield and a good state of purity.

In accordance with this invention the method of preparation currently preferred consists in commingling 5-nitro-2-furaldehyde and O,O-diethyl hydrazidothionphosphate, preferably in the presence of an inert diluent such as benzene, in a suitable reaction vessel. To bring about optimum yield of the reaction it is advantageous to supply heat briefly to the reaction vessel. When the reaction is complete, the contents of the vessel are cooled and, in order to promote rapid crystallization of the desired product, a precipitating liquid such as hexane is added. The desired product is recovered in conventional fashion such as filtration or centrifugation. It may be recrystallized, if desired, from a suitable solvent such as isopropanol.

In order that this invention may be fully available to and understood by those skilled in the art, the following illustrative but not limitative example is supplied:

(A) *Preparation of O,O-diethyl hydrazidothionphosphate*

100% hydrazine hydrate (50 ml., 50 g., 1.0 mole) is placed in a 500 ml., 3-necked flask fitted with a stirrer, addition funnel, and reflux condenser. Diethyl thiophosphoryl chloride (94 g., 0.5 mole) is added slowly to the stirred hydrazine. The reaction is exothermic. After the addition, the mixture is stirred and heated (ca. 50–60° C.) for an hour. The mixture is cooled to room temperature, and then water is added (ca. 300 ml.). The mixture is stirred for fifteen minutes. The two layers are separated (product is the lower layer) to yield 76 g. (82.6%).

(B) *Preparation of O,O-diethyl [2-(5-nitrofurfurylidene) hydrazino] thiophosphate*

5-nitro-2-furaldehyde (29 g., 0.2 mole), diethyl hydrazidothionphosphate (36.8 g., 0.2 mole), and benzene (ca. 1000 ml.) are placed in a flask. The mixture is heated on a steam bath for fifteen minutes. During the heating, water is evolved and a clear solution forms. The solution is cooled and diluted with a large volume of hexane. The product is collected and washed with hexane to yield 50 g. (81.5%), M.P. 95–97°. Purification may be effected by recrystallization from 50% aq. isopropanol, M.P. 101.5–102.5° C.

*Analysis.*—Calc. for $C_9H_{14}N_3O_5PS$: C, 35.18; H, 4.59; N, 13.68. Found: C, 35.46; 35.31; H, 4.76; 4.80; N, 13.40; 13.49.

What is claimed is:
The chemical compound O,O-diethyl [2-(5-nitrofurfurylidene)hydrazino] thiophosphate.

References Cited by the Examiner
UNITED STATES PATENTS

| 2,639,287 | 5/53 | Scudi et al. | 260—347.2 |
| 2,885,321 | 5/59 | Hollis | 167—53.1 |
| 2,943,019 | 6/60 | Natta | 167—53.1 |
| 2,945,047 | 7/60 | Sherman | 260—347.2 |
| 2,965,667 | 12/60 | Tolkmith | 260—461.106 |

OTHER REFERENCES
Dunlop: The Furans (Reinhold, 1953), pages 164–6.

IRVING MARCUS, *Primary Examiner.*
NICHOLAS S. RIZZO, *Examiner.*